(12) United States Patent
Bingham

(10) Patent No.: US 8,682,796 B2
(45) Date of Patent: Mar. 25, 2014

(54) DIGITAL RESOURCE ACQUISITION

(75) Inventor: Talin Ryan Bingham, Wanship, UT (US)

(73) Assignee: Sirsi Corporation, Lehi, UT (US)

( * ) Notice: Subject to any disclaimer, the term of this patent is extended or adjusted under 35 U.S.C. 154(b) by 0 days.

(21) Appl. No.: 13/592,583

(22) Filed: Aug. 23, 2012

(65) Prior Publication Data
US 2014/0058888 A1    Feb. 27, 2014

(51) Int. Cl.
*G06F 21/00* (2013.01)
*G06Q 20/00* (2012.01)

(52) U.S. Cl.
USPC ............................................... 705/51

(58) Field of Classification Search
USPC .............. 705/51, 16, 21, 59, 71; 380/44, 262, 380/278, 279
See application file for complete search history.

(56) References Cited

U.S. PATENT DOCUMENTS

| | | | |
|---|---|---|---|
| 2008/0052241 A1* | 2/2008 | Chaplin | 705/52 |
| 2009/0222926 A1* | 9/2009 | Pavan et al. | 726/26 |
| 2009/0287583 A1* | 11/2009 | Holmes | 705/26 |
| 2012/0158547 A1* | 6/2012 | Wood et al. | 705/27.1 |

* cited by examiner

*Primary Examiner* — Dante Ravetti
(74) *Attorney, Agent, or Firm* — Workman Nydegger

(57) ABSTRACT

Providing digital works to patrons. A method includes at a library check-out service for a library, providing a computer implemented user interface for library patron use. The method further includes at the user interface, receiving a check-out request for a digital work from a patron. Determinations are made that: the digital work is not available in the library's inventory of available digital works; funds are available to procure one or more copies of the digital work; the digital work is available from a catalog of purchasable items; and the one or more copies of the digital work meets the library's purchasing criteria. Based on these determinations, the method further includes automatically acquiring the one or more copies of the digital work. The digital work is then provided to the patron.

20 Claims, 3 Drawing Sheets

DIGITAL RESOURCE ACQUISITION

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system. Interconnected computing systems can be used to implement library functionality.

Libraries have evolved slowly over time until recent times. Typically a library housed a collection of books and the quality of the library was determined by the number of volumes that the library housed and the diversity of works maintained by the library. Libraries could increase their reputation by entering into agreements with other libraries to share works through inter-library loans.

In recent history, digital (or electronic) works have been created at an astounding rate. Such digital works may include original works created by authors and distributed digitally alone or along with printed versions; automatically generated digital works aggregating content from other digital works; digital works created from works formerly available only in printed form, such as by scanning, optical character recognition, transcribing, etc.; digital audio or video recordings; etc. The growth of the body of available digital works has been exponential in nature. To stay relevant, libraries have had to adapt to be able to provide digital works as well as physical works to patrons. Digital works may be delivered electronically as a digital download via a communication medium such as a network.

Digital works are distributed by digital content publishers. However, libraries may be able to procure and deliver digital works for loan or for direct purchase by library users. Typically, a library will have one or more licenses to a digital work and can allow library patrons to "check-out" one of the one or more licenses. While a digital work is checked out by a patron, the patron can access the digital work on an e-book reader or other electronic reading device. However, the library is only able to check out the number of licenses that the library has purchased.

When a patron checks a digital work back in, the patron is no longer able to access the digital work and the license is available for other patrons to check out the digital work and to load the digital work on an electronic e-book reader or other electronic reading device.

As with virtually all resources acquired by a library, there is limited funding for procuring electronic resources. Thus, libraries must determine efficient ways to procure resources to best serve the patronage of the library. In particular, it is advantageous if libraries are able to make license purchases for digital works that are able to satisfy the greatest number of patrons without procuring licenses that are never or rarely used. Library resources need to be spent judiciously to accomplish these goals.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method practiced in a library computing environment. The method includes acts for providing digital works to patrons. The method includes at a library check-out service for a library, providing a computer implemented user interface for library patron use. The method further includes at the user interface, receiving a check-out request for a digital work from a patron. A determination is made that the digital work is not available in the library's inventory of available digital works. A determination is made that funds are available to procure one or more copies of the digital work. A determination is made that the digital work is available from a catalog of purchasable items. A determination is made that the one or more copies of the digital work meets the library's purchasing criteria. Based on determining that the digital work is not available in the library's inventory of available digital works, determining that funds are available to procure one or more copies of the digital work, determining that the digital work is available from a catalog of purchasable items, and determining that the one or more copies of the digital work meets the library's purchasing criteria, the method further includes automatically acquiring the one or more copies of the digital work. The digital work is then provided to the patron.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments may be directed to system and methods for obtaining digital works from publishers in a fashion that allows for efficient use of resources when acquiring the digital works. In particular, embodiments allow users, such as library patrons, to request digital works from a library. A determination can be made as to whether or not the library has the digital work. If the library does not have the digital work, then various criteria can be evaluated to determine whether or not the library should obtain the digital work. Such criteria may include one or more of availability of the work from publishers, internal criteria of a library, and the availability of funds to purchase the work.

Figure 1:
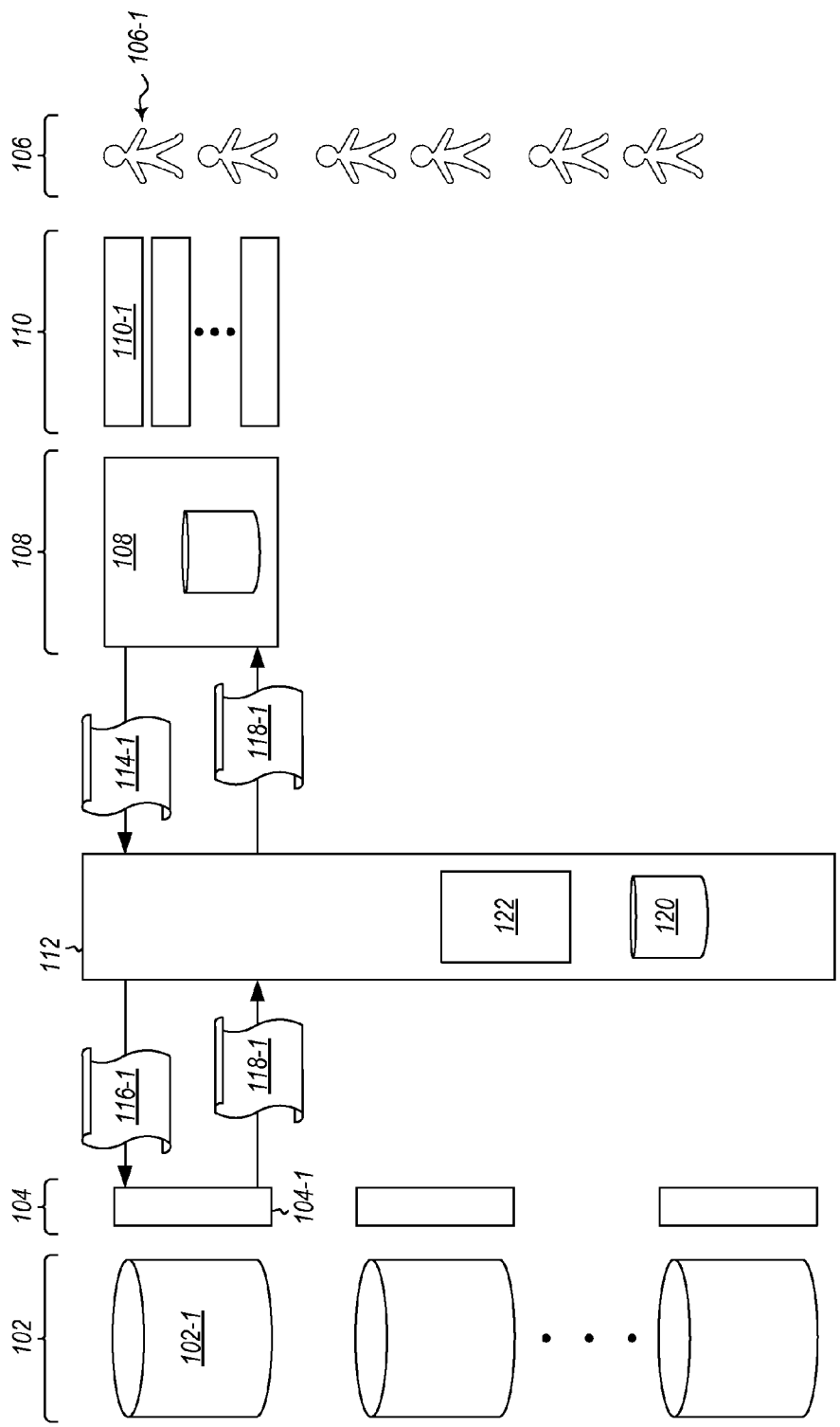
FIG. 1 illustrates digital work acquisition.

Referring now to FIG. 1, an example is illustrated. FIG. 1 illustrates a set of digital content publishers 102. The digital content publishers 102 provide digital works to consumers of the digital works. Each of the content publishers provides content using a specific format. In the example shown in FIG. 1, a set of specific publisher interfaces 104 are shown. Each interface for each publisher may be slightly or drastically different from an interface for a different publisher. In addition to the specific publisher interfaces, a publisher may use Machine Readable Catalogue (MARC) interfaces/messages or some other format such as XML (eXtensible Markup Language) to determine what content is at a particular publisher. MARC and/or XML messages may provide bibliographic information and related information about works. For example, a MARC message may provide information that may include, for example, title, author, publisher, copyright date, etc.

FIG. 1 illustrates a set of patrons (sometimes referred to herein as users) 106. Patrons are, in some embodiments, the end use consumers of digital and physical content. The patrons may obtain the resources from the publishers 102. Patrons 106 may obtain content from the publishers 102 either directly from the publishers 102 or through an intermediary. If content is obtained directly from the publishers 102, then a patron will likely use a different user interface 104 for each different publisher from which a patron obtains content. For example, each publisher in the set of publishers 102 may have different ways of specifying resources to accessed, different authentication protocols for authorizing a user to access a resource, etc.

Even using certain intermediary models, a patron may still need to use a different user interface for obtaining a resource from a different publisher. For example, FIG. 1 further illustrates an integrated library system (ILS) 108. An ILS is typically managed by a library and allows patrons to "check out" or purchase digital works for which the library has a license. The ILS is associated with one or more interfaces as illustrated by the set of ILS user interfaces 110. Each of the ILS user interfaces in the set of ILS user interfaces determines how a patron will interact with an ILS in the set of ILSs 108. The ILS interfaces may be user interfaces available for different purposes or different user environments. For example, some interfaces in the set of interfaces 110 may be designed for use with a web browser. Other interfaces in the set of interfaces 110 may be designed for use with a stand-alone application such as an "app" on a mobile device or a widget. Still other interfaces in the set of interfaces 110 may be designed for use as portals in an enterprise environment. While a user may be able to consistently use one or more of the interfaces in the set of ILS interfaces 110, a given ILS may direct a patron directly to a publisher in the set of publishers 102 to obtain a given resource. This causes the patron to access a user interface provided by the publisher, which as noted above may vary from one publisher to the next.

However, embodiments may use an intermediary proxy between patrons, the ILS 108 and publishers 102 which allows patrons to use a consistent interface regardless of the publisher. FIG. 1 further illustrates a centralized electronic resource system 112. The centralized electronic resource system 112 includes the ability to communicate using any one of the interfaces 104. In this way, the centralized electronic resource system 112 can access the publishers 102 and store content from the publishers 102 in a content database 120. The content database 120 may contain the actual publisher 102 content or may simply contain a proxy URL or pointer to the actual publisher 102 content. The centralized electronic resource system 112 can also pass credential information from the patrons 106 and/or the ILS 108 thru to the publishers 102. The centralized electronic resource system 112 can present appropriate credentials to the publishers 102 as if the centralized electronic resource system 112 were the patrons 106 or the ILS 108. The centralized electronic resource system 112 can then pass the resources on to the patrons 106 through the ILS 108.

Illustrating now a specific example, a patron 106-1 may send a request 114-1 for an electronic resource 118-1 using an interface 110-1 of an ILS 108. It should be noted that a patron 106 may obtain electronic resources from a publisher with a library acting as an intermediary. In particular, an ILS 108 may be associated and controlled by the library. For example, in some embodiments, the ILS 108 may be integrated directly into a check-out system or some other system at the library which the user can access directly or indirectly to request electronic resources from publishers 102. The request 114-1 is intercepted by the centralized electronic resource system 112. In some embodiments, the request 114-1 may be in a standard form appropriate for the centralized electronic resource system 112, but that can be sent without respect to the eventual source of an electronic resource (i.e. a publisher). The centralized electronic resource system 112 converts the request 114-1 to a request 116-1 in format and a protocol appropriate for the specific publisher 102.

In some embodiments as outlined below, the centralized electronic resource system 112 is able to convert a request 114-1 to the request 116-1 in an appropriate format and protocol based on normalized metadata. In particular, the centralized electronic resource system 112 may receive metadata from a publisher. The metadata may include specific information about how the publisher can be accessed. This metadata can be normalized such that a request 114-1 can be consistent no matter from what eventual publisher an electronic resource 118-1 is obtained.

In some embodiments, the centralized electronic resource system 112 may act as a proxy for the patron 106-1 or the ILS 108. For example, the centralized electronic resource system 112 may receive authentication credentials (e.g., username and password) from the patron 106-1 or the ILS 108. The centralized electronic resource system 112 may then present these credentials to the publisher 102-1 as if the centralized electronic resource system 112 were the patron 106-1 or the ILS 108. The publisher 102-1 will then interact with the centralized electronic resource system 112 as if it were the patron 106-1 or the ILS 108.

The publisher 102-1 returns a resource 118-1 based on the request 116-1. The resource 118-1 can then be sent to the ILS 108 and finally to the patron 106-1.

The resource 118-1 can be delivered to the patron 106-1 in one or more of a number of different formats depending on technology at the disposal of the patron 106-1. In particular, the patron may have one or more of a personal computer, an e-book reader, a tablet device, a cell-phone, a handheld electronic device, or other device. The publisher 102-1 may provide the resource 118-1 in a format appropriate for the device(s) available to the patron 106-1. In some embodiments, a patron may be able to register with the centralized electronic resource system 112 what devices the patron 106-1 has. The centralized electronic resource system 112 can then automatically, or at the request of the patron 106-1, obtain a particular format of the resource 118-1 appropriate for the patron 106-1. Alternatively, the patron may be prompted to select an available format from a list of formats provided by the publisher for the specific resource. The patron may also state that a particular format is the default format to be used in all subsequent requests for that patron.

In some embodiments, the publisher 102-1 may provide the resource 118-1 in a format based on interaction with the centralized electronic resource system 112. For example, the centralized electronic resource system 112 may request a format that the centralized electronic resource system 112 knows is supported by devices in possession of the patron 106-1. For example, the publisher 102-1 may include protocol features that allow the centralized electronic resource system 112 to specify a particular format. The centralized electronic resource system 112 can use these protocol features to request a particular format of the resource 118-1.

Alternatively, the centralized electronic resource system 112 may act as a proxy for a particular device in possession of the patron 106-1, and receive formats based on what type of device the publisher 102 thinks that it is interacting with irrespective of the actual type of device the publisher 102 is interacting with. In this example, the publisher 102 provides resources in a format based on the type of device with which the publisher 102 believes it is interacting. Thus for example, the publisher may believe that it is interacting with an e-book reader device, and therefore provide a format appropriate for an e-book. Illustratively, the centralized electronic resource system 112 may spoof a user agent appropriate for a particular device in possessions of the patron 106-1. For example, nearly all web browsers specify a user agent when making HTTP requests. The user agent may identify an operating system, browser client and other information. Thus, even though the centralized electronic resource system 112 is not necessarily running a particular operating system, such as a mobile device operating system, the centralized electronic resource system 112 can spoof a user agent that causes the publisher 102-1 to believe that the centralized electronic resource system 112 is running the spoofed operating system. This may cause the publisher 102-1 to deliver the resource 118-1 in a format appropriate for the spoofed user agent to the centralized electronic resource system 112. The resource 118-1 can then be delivered to the ILS 108 and/or the patron 106-1 in a format appropriate for the patron 106-1.

In some embodiments, the electronic resource 118-1 is returned thru the centralized electronic resource system 112 immediately upon request or very shortly thereafter. However, in other embodiments, the actual electronic resource 118-1 may not be delivered to a patron's device until later. For example, the electronic resource may not be delivered until the patron 106 opens up the appropriate e-book reader or other reader application. For example, in some embodiments, the patron 106 makes the request and the electronic content is effectively "checked out" to the patron 106, but the electronic resource 118-1 itself stays at the publishers database 102-1 until the patron 106 opens their e-book reader or other appropriate software application and does a synchronization process.

The centralized electronic resource system 112 may include functionality for obtaining a plurality of different formats of the electronic resource 118-1 for the patron 106-1. For example, the patron 106-1 may have access to a number of different devices capable of rendering electronic resources. For example, the patron 106-1 may have a smart phone, an e-book reader, a tablet device, a laptop, etc. The centralized electronic resource system 112 can download different formats of the same electronic resource 118-1, one suitable for each device. In particular, each device may have different formatting and/or digital rights management (DRM) schemes. The centralized electronic resource system 112 can obtain, e.g. by direct request or acting as a proxy, different formats of the same electronic resource 118-1 with appropriate formatting and/or DRM protocols.

As noted a patron 106-1 may obtain electronic resources from a publisher with a library acting as an intermediary. In particular, an ILS 108 (FIG. 1) may be associated and controlled by the library. For example, in some embodiments, the ILS 108 may be integrated directly into the check-out system or some other system at the library which the user can access directly or indirectly to request electronic resources from publishers 102. A patron 106-1 can request electronic resources as a patron of the library in one or more of a number of different ways. For example, in one embodiment, the patron 106-1 may physically enter the library and interact with the check-out system which is interconnected with the centralized electronic resource system 112. In an alternative embodiment, the patron 106-1 may use a personal electronic device to access the check-out system, which in turn requests resources from the centralized electronic resource system 112, which in turn requests resources from the publishers 102 through an appropriate communication path. The personal electronic device may be one or more of a number of devices such as an e-book reader, a cellular telephone, a tablet computing device, a laptop, a desktop or other device.

Figure 2:
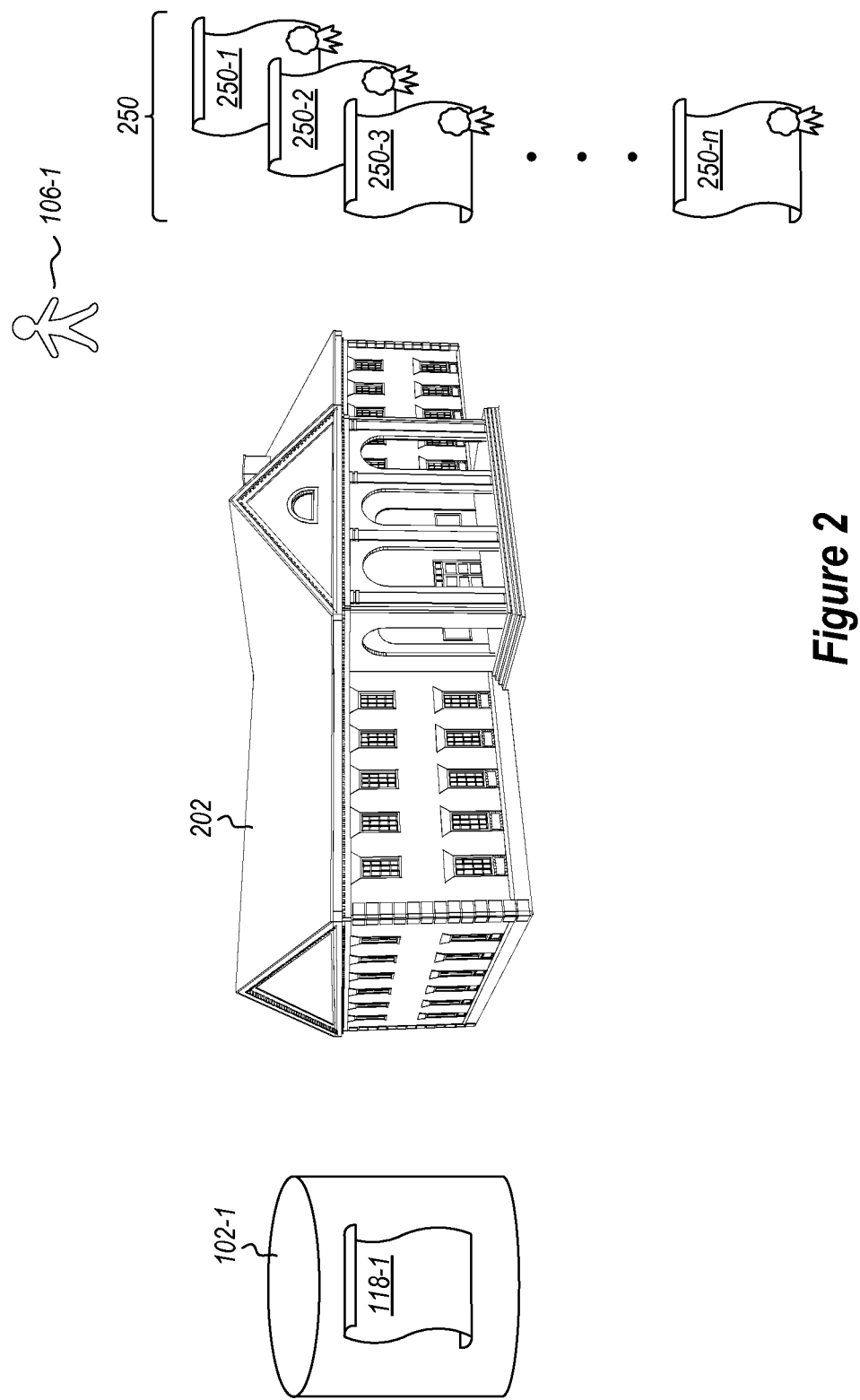
FIG. 2 illustrates a library providing digital work to a patron.

Referring now to FIG. 2, the ability for a patron 106-1 to obtain an electronic resource 118-1 from a publisher or other source may be based on licenses 250 maintained by a library 202. In particular, a library 202 may have a certain number (n) of licenses 250-1-250-n for a digital work 118-1, and patrons can "borrow" the digital work 118-1 from the publishers or other sources using the licenses 250 maintained by the library 202. For example, the library 202 may have several licenses to a digital work 118-1. A patron 106-1 can digitally check out the digital work 118-1 using one of the licenses allowing the patron 106-1 to obtain the digital work from a publisher, from a repository maintained by the library 202, or from some other source and to access the digital work 118-1. The library 202 can only check out the digital work 118-1 to n patrons because the library only has n licenses. However, the check-out period may be for a limited period of time and when that time expires, the library will be able to check out the digital work 118-1 to other patrons, while patrons whose check-out times have expired will no longer be able to access the digital work 118-1.

Further, if a patron attempts to check out a digital work from a library that does not have a license for the digital work, the patron will not be able to obtain the digital work from the library that does not have a license for the digital work. However, embodiments may include functionality for allowing the library to obtain licenses for digital works based on a consumer requesting the digital work from the library. In particular, embodiments may obtain licenses for which the library does not have a license or for which the library does not have sufficient licenses.

However, libraries have limited resources such that the libraries are not able to purchase license for every request that a patron may have. Thus, embodiments herein may include various criteria for determining if licenses should be obtained based on a patron request for a digital work.

Figure 3:
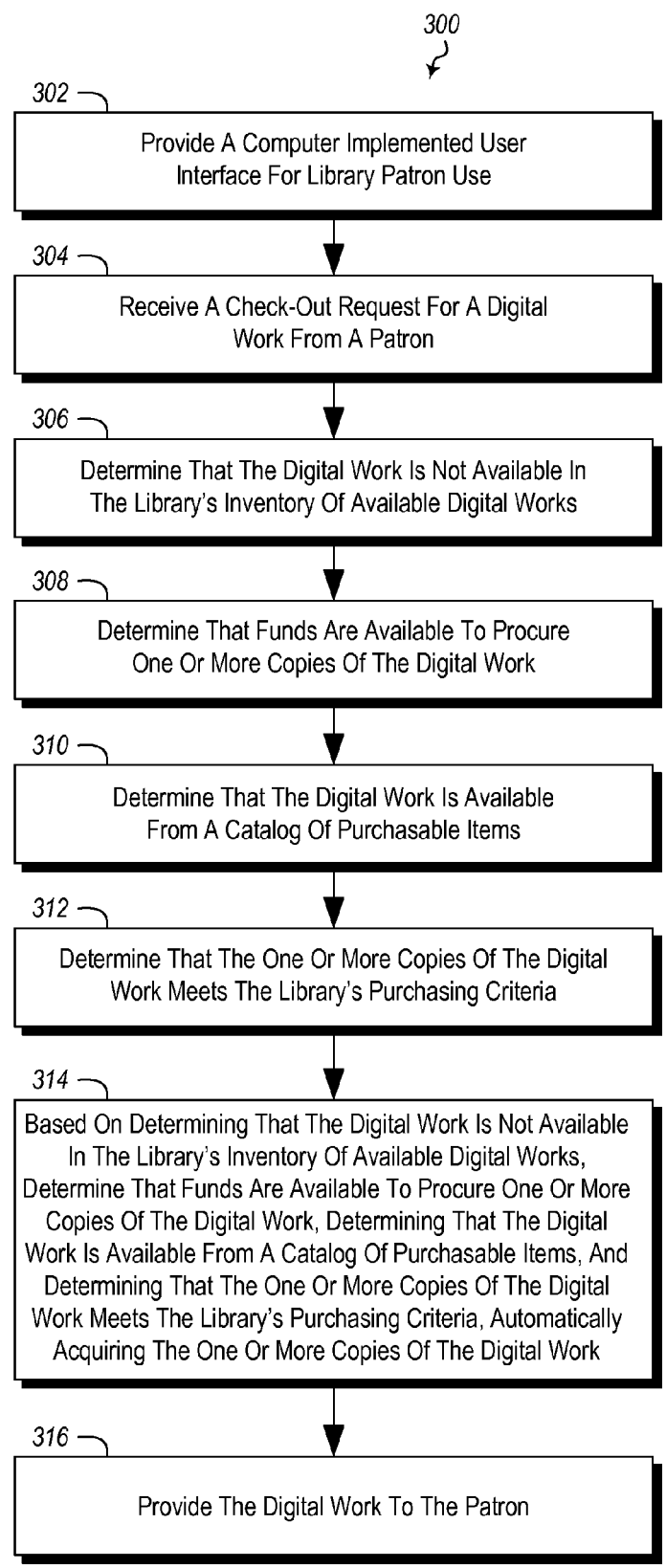
FIG. 3 illustrates a method of providing digital works to patrons.

FIG. 3 illustrates a number of methods and method acts that may be performed for obtaining licenses for digital works. Although the method acts may be discussed in a certain order or illustrated in a flow chart as occurring in a particular order, no particular ordering is required unless specifically stated, or required because an act is dependent on another act being completed prior to the act being performed.

FIG. 3 illustrates a method 300 that may be practiced in a library computing environment. The method 300 includes acts for providing digital works to patrons. The method includes at a library check-out service for a library, providing a computer implemented user interface for library patron use (act 302). As noted above, the interface may be an interface accessible at a library computing system. For example, the interface may be implemented on a computing system physically accessible at a library, such as the library 202. Alternatively, the interface may be implemented on a device owned or generally in the possession of the patron. For example, as illustrated in FIG. 1, the patron may use their own device to access the ILS 108 where the ILS 108 is operated by a particular library.

The method 300 may further include at the user interface, receiving a check-out request for a digital work from a patron (act 304). For example, a patron may request a digital work that is shown as being available from a library. The user can use various buttons or other user interface elements to search for and select such works.

The method 300 may further include determining that the digital work is not available in the library's inventory of available digital works (act 306). In particular, the ILS 108 may be able to show the work as available from the library 202, but yet the work may not be available to be delivered to the patron 106-1. This can happen, for example, if the library 202 has not purchased any licenses to the digital work or if all of the licenses purchased for the digital work are already being used by other patrons.

The method 300 may further include determining that funds are available to procure one or more copies of the digital work (act 308). Determining that funds are available can be done in a number of different ways. For example, the library 202 may simply have a dollar amount budget and as licenses are purchased, this budget can be reduced by the purchase amount. Licenses may be acquired for digital works until the budget is depleted. This would allow the library 202 to purchases licenses (in effect purchasing the digital work) that it knows are being used by at least one patron. Other embodiments may evaluate other criteria to determine if funds are available.

For example in one embodiment, funds for acquiring one or more copies of the digital works are allocated to different branches of the library. In some such embodiments, determining that funds are available to procure the one or more copies of the digital work is based on a particular branch having funds available from an allocation. For example, a city or county may operate a library system. The library system could allocate funds to each of the different branches. Determination of fund availability may be based on availability of funds for a particular branch from which the digital work was requested.

In another example embodiment, funds for acquiring one or more copies of digital works are allocated for different genres or classifications. In some such embodiments, determining that funds are available to procure the one or more copies of the digital work is based on funds being available for a genre or classification to which the digital work belongs. For example, certain funds may be allocated for fiction works, while other funds are allocated to non-fiction works. Certain funds may be allocated to periodicals. Certain funds may be allocated to history books. Certain funds may be allocated to text books. Certain funds may be allocated to manuals. Etc. Additionally, funds within a genre or classification may be further subdivided. For example, fiction may have further sub divisions, such as historical fiction, science fiction, etc. The sub-divisions could have a portion of the fiction budget allocated to them. Thus, determinations that funds are available could be made based on a genre or classification basis with respect to remaining funds allocated for a particular genre or classification.

In yet another example embodiment, funds for acquiring one or more copies of digital works are allocated for different periods of time. In some such embodiments, determining that funds are available to procure the one or more copies of the digital work is based on funds being available for a period of time in which the digital work was requested. For example, procurement budgets may be based on quarterly, monthly, seasonal or other time period based criteria. In one specific example, embodiments may allocate budgets for certain types of works at certain times. For example, there may be an allocation specifically for holiday books in November and December.

In yet another example embodiment, funds for acquiring one or more copies of digital works are allocated for different demographics. In some such embodiments, determining that funds are available to procure the one or more copies of the digital work is based on funds being available for a demographic to which the patron belongs. In particular, certain demographics may have funds allocated to them. Such demographics may include age, language, zip code, household income, etc. If a patron belongs to a particular demographic, funds available for that demographic may be determined. Some demographics may have preferential or less preferential treatment. For example, a library may wish to drastically limit the number of works procured as a result of juveniles requesting the works.

In yet another example embodiment, funds for acquiring one or more copies of digital works are limited on a per patron basis. In some such embodiments, determining that funds are available to procure the one or more copies of the digital work is based on the patron not having reached their limit. This may be used to limit the number of digital work licenses that a given patron can cause to be purchased.

In yet another example embodiment, funds for acquiring one or more copies of digital works are allocated based on groups. In some such embodiments, determining that funds are available to procure the one or more copies of the digital work is based on funds being available for a group to which the patron belongs. For example funds may be allocated on a family or organization basis.

In yet another example embodiment, funds for acquiring digital works are allocated for different sub-libraries within a library system. In some such embodiments, determining that funds are available to procure the one or more copies of the digital work is based on funds being available for a sub-library. For example, a university library system may have a medical library and a law library. The medical library may have different funds allocated than the law library.

In yet another example embodiment, funds for acquiring digital works are allocated based on a patron's contribution to the library. For example, a patron may pay all or a portion of the cost for a license for a digital work. Alternatively, the patron may be a regular donor to a library and thus may have additional funds allocated to them for digital work requests or preferential treatment in determining of works can be acquired at the request of such patrons.

The method 300 may further include determining that the digital work is available from a catalog of purchasable items (act 310). For example, embodiments may be implemented where determining that the digital work is available from a catalog of purchasable items comprises checking inventory of an aggregator, distributor or publisher.

The method 300 may further include determining that the one or more copies of the digital work meets the library's purchasing criteria (act 312). Such purchasing criteria may include, for example, determining that the work is appropriate for a particular sub library or branch. For example, a medical library of a university library will likely have purchasing criteria directed to the medical library only acquiring works relevant to medical topics. Similarly, a branch of a library catering to children will likely have criteria limiting more adult subjects from being acquired by the branch. Purchasing criteria may include limits on the number of licenses that the library will have for a particular work. Purchasing criteria may include limits based on age. For example, certain patrons will not be able to request certain works because of age restrictions. This could be done to restrict adult type books from being requested by children. Purchasing criteria may have limits based on fines or fees. For example, a patron may be ineligible to request works based on the patron having outstanding fines or fees that need to be paid to the library. Purchasing criteria may have limits based on content restrictions. Purchasing criteria may be based on blacklists restricting acquisition of certain content and/or whitelists of digital works that may be acquired. Purchasing criteria may be based on digital or other format restrictions, licensing restrictions, license validity periods, etc. Purchasing criteria may be based on a patron's contribution to the library. Other criteria, though not set specifically enumerated, may alternatively or additionally be used.

The method 300 may further include based on determining that the digital work is not available in the library's inventory of available digital works, determining that funds are available to procure one or more copies of the digital work, determining that the digital work is available from a catalog of purchasable items, and determining that the one or more copies of the digital work meets the library's purchasing criteria, automatically acquiring the one or more copies of the digital work (act 314).

The method 300 may further include providing the digital work to the patron (act 316). This may include providing a license to or authorizing a license for the patron and allowing the digital work to be accessed. The patron may obtain the actual data for the digital work from a publisher or other source, or it may be provided by the library as part of the check-out process.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a library computing environment a method of providing digital works to patrons, the method comprising:
   providing, by a computer, a user interface that performs a library check-out service for patron use;
   receiving, by the computer, a check-out request for a digital work from a patron through the user interface;
   determining, by the computer, that the digital work is not available in the library's inventory of available digital works;
   accessing, by the computer, a defined purchasing criteria for the library defining criteria for the library to follow when purchasing digital works;
   determining, by the computer, at least one of a characteristic of the library, a characteristic of the patron, or a characteristic of the digital work;
   determining, by the computer, that funds are available to procure one or more copies of the digital work based on at least one of a characteristic of the library, a characteristic of the patron, or a characteristic of the digital work;
   determining that the digital work is available from a catalog of purchasable items;
   determining that the one or more copies of the digital work meets purchasing criteria for the library;
   based on:
   determining that the digital work is not available in the library's inventory of available digital works;
   determining that funds are available to procure one or more copies of the digital work;
   determining that the digital work is available from a catalog of purchasable items; and
   determining that the one or more copies of the digital work meets the library's purchasing criteria, and automatically acquiring the one or more copies of the digital work to loan to patrons of the library; and
   checking-out the digital work to the patron.

2. The method of claim 1, wherein funds for acquiring one or more copies of the digital works are allocated to different branches of the library and wherein determining that funds are available to procure the one or more copies of the digital work comprises determining that a particular branch has funds available from an allocation.

3. The method of claim 1, wherein funds for acquiring one or more copies of digital works are allocated for different genres or classifications and wherein determining that funds are available to procure the one or more copies of the digital work comprises determining that funds are available for a genre or classification to which the digital work belongs.

4. The method of claim 1, wherein funds for acquiring one or more copies of digital works are allocated for different periods of time and wherein determining that funds are available to procure the one or more copies of the digital work comprises determining that funds are available for a period of time in which the digital work was requested.

5. The method of claim 1, wherein funds for acquiring one or more copies of digital works are allocated for different demographics and wherein determining that funds are available to procure the one or more copies of the digital work comprises determining that funds are available for a demographic to which the patron belongs.

6. The method of claim 1, wherein funds for acquiring one or more copies of digital works are limited on a per patron basis and wherein determining that funds are available to procure the one or more copies of the digital work comprises determining that the patron has not reached a limit for the patron.

7. The method of claim 1, wherein funds for acquiring one or more copies of digital works are allocated based on groups and wherein determining that funds are available to procure the one or more copies of the digital work comprises determining that funds are available for a group to which the patron belongs.

8. The method of claim 1, wherein funds for acquiring digital works are allocated for different sub-libraries within a library system and wherein determining that funds are available to procure the one or more copies of the digital work comprises determining that funds are available in a sub-library allocation.

9. The method of claim 1, wherein funds for acquiring digital works are allocated to a patron based on the patron's contribution to the library and wherein determining that funds are available to procure the one or more copies of the digital work comprises determining that funds are available for the patron based on the allocation to the patron.

10. The method of claim 1, wherein determining that the digital work is available from a catalog of purchasable items comprises checking inventory of an aggregator, distributor, or publisher.

11. The method of claim 1, wherein determining that the one or more copies of the digital work meets the library's purchasing criteria comprises evaluating a number of licenses already owned by the library for the digital work.

12. The method of claim 1, wherein determining that the one or more copies of the digital work meets the library's purchasing criteria comprises evaluating age restrictions established for the library.

13. The method of claim 1, wherein determining that the one or more copies of the digital work meets the library's purchasing criteria comprises evaluating fine or fees that might make a patron ineligible to request digital works.

14. The method of claim 1, wherein determining that the one or more copies of the digital work meets the library's purchasing criteria comprises evaluating content restrictions for the library for digital works.

15. The method of claim 1, wherein determining that the one or more copies of the digital work meets the library's purchasing criteria comprises evaluating a black list.

16. The method of claim 1, wherein determining that the one or more copies of the digital work meets the library's purchasing criteria comprises evaluating a whitelist.

17. The method of claim 1, wherein determining that the one or more copies of the digital work meets the library's purchasing criteria comprises evaluating formats restrictions on available digital works.

18. The method of claim 1, wherein determining that the one or more copies of the digital work meets the library's purchasing criteria comprises evaluating licensing restrictions on available digital works.

19. In a library computing environment, a non-transitory physical computer readable storage medium, comprising computer executable instructions that when executed by one or more processors cause one or more processors to perform the following steps of:
- providing a user interface that performs a library check-out service for patron use;
- receiving a check-out request for a digital work from a patron through the user interface;
- determining that the digital work is not available in the library's inventory of available digital works;
- accessing a defined purchasing criteria for the library defining criteria for the library to follow when purchasing digital works;
- determining at least one of a characteristic of the library, a characteristic of the patron, or a characteristic of the digital work;
- determining that funds are available to procure one or more copies of the digital work based on at least one of a characteristic of the library, a characteristic of the patron, or a characteristic of the digital work;
- determining that the digital work is available from a catalog of purchasable items;
- determining that the one or more copies of the digital work meets purchasing criteria for the library;
- based on:
- determining that the digital work is not available in the library's inventory of available digital works;
- determining that funds are available to procure one or more copies of the digital work;
- determining that the digital work is available from a catalog of purchasable items; and
- determining that the one or more copies of the digital work meets the library's purchasing criteria, and automatically acquiring the one or more copies of the digital work to loan to patrons of the library; and
- checking-out the digital work to the patron.

20. In a library computing environment a system for providing digital works to patrons, the system comprising:
- one or more processors;
- one or more non-transitory physical computer readable storage media, wherein the one or more non-transitory physical computer readable storage media comprise computer executable instructions that when executed by one or more of the one or more processors cause one or more of the one or more processors to perform the following steps of:
- providing a user interface that performs a library check-out service for patron use;
- receiving a check-out request for a digital work from a patron through the user interface;
- determining that the digital work is not available in the library's inventory of available digital works;
- accessing a defined purchasing criteria for the library defining criteria for the library to follow when purchasing digital works;
- determining at least one of a characteristic of the library, a characteristic of the patron, or a characteristic of the digital work;
- determining that funds are available to procure one or more copies of the digital work based on at least one of a characteristic of the library, a characteristic of the patron, or a characteristic of the digital work;
- determining that the digital work is available from a catalog of purchasable items;
- determining that the one or more copies of the digital work meets purchasing criteria for the library;
- based on:
- determining that the digital work is not available in the library's inventory of available digital works;
- determining that funds are available to procure one or more copies of the digital work;
- determining that the digital work is available from a catalog of purchasable items; and
- determining that the one or more copies of the digital work meets the library's purchasing criteria, and automatically acquiring the one or more copies of the digital work to loan to patrons of the library; and
- checking-out the digital work to the patron.

* * * * *